Figure 5:
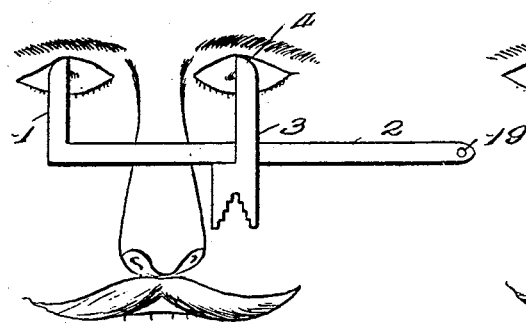

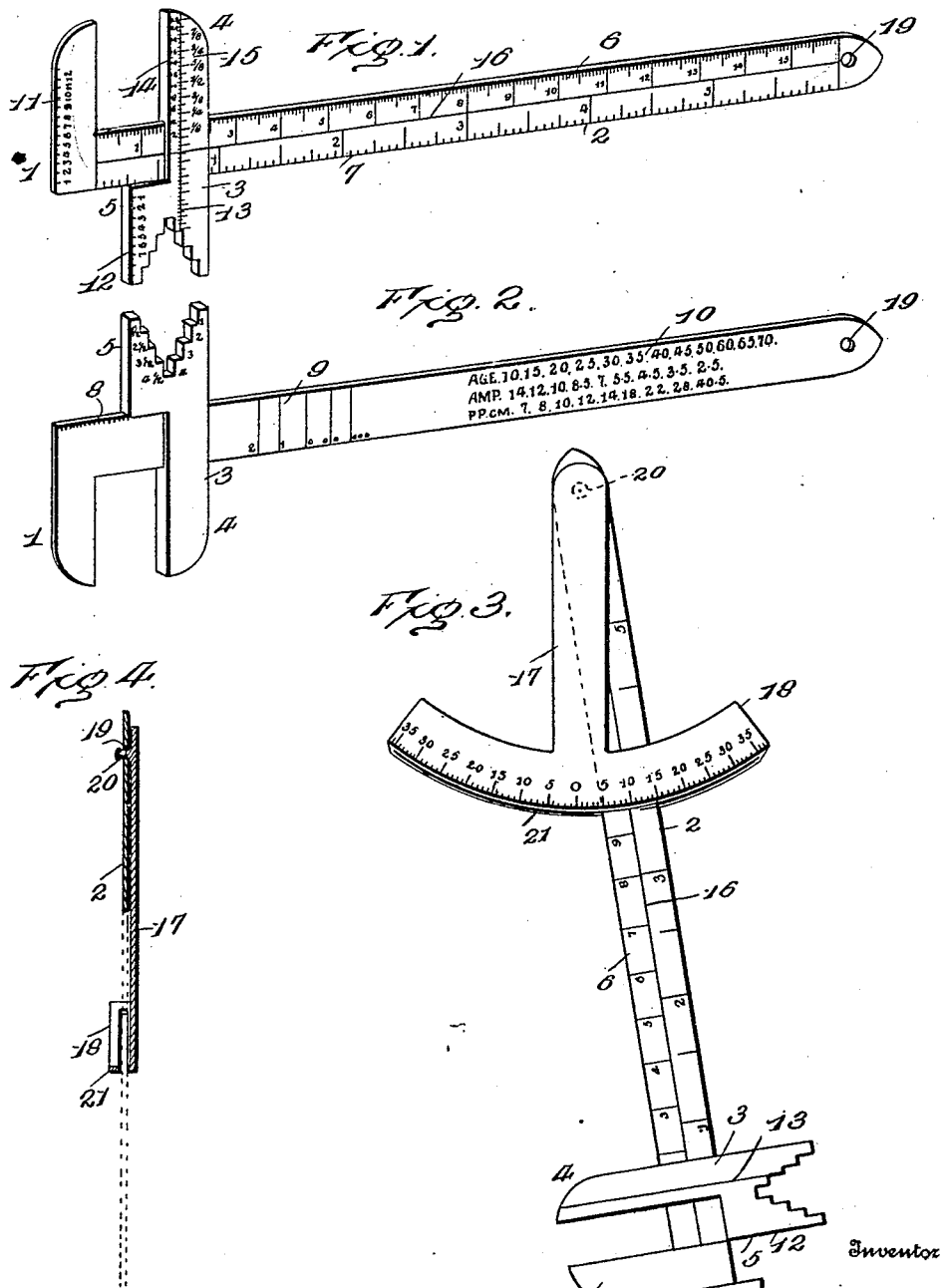

No. 878,507. PATENTED FEB. 11, 1908.
J. M. COGHLAN.
OPTICIAN'S MEASURING INSTRUMENT.
APPLICATION FILED AUG. 21, 1907.

2 SHEETS—SHEET 2.

Inventor
Joseph M. Coghlan

Witnesses

By
Attorneys

UNITED STATES PATENT OFFICE.

JOSEPH M. COGHLAN, OF PATCHOGUE, NEW YORK.

OPTICIAN'S MEASURING INSTRUMENT.

No. 878,507.　　　　Specification of Letters Patent.　　　　Patented Feb. 11, 1908.

Application filed August 21, 1907. Serial No. 389,513.

*To all whom it may concern:*

Be it known that I, JOSEPH M. COGHLAN, citizen of the United States, residing at Patchogue, in the county of Suffolk and State of New York, have invented certain new and useful Improvements in Opticians' Measuring Instruments, of which the following is a specification.

This invention has for its object to devise a novel instrument for the use of opticians to enable the facial measurements to be accurately and conveniently determined and spectacles, eye glasses and the like to be fitted with precision so as to secure comfort and a neat appearance.

The invention consists of an instrument comprising angularly disposed arms, a slide mounted upon one of said arms, and a protractor or pivoted scale adapted to be fitted to one of the arms of the instrument and free to swing by gravitative force to automatically register angles or prismatic measurements, the several parts being graduated in a peculiar way with reference to determining the measurements to insure accuracy of fit of the several appliances coming within the field of the optician, such as eye glasses, spectacles, artificial eyes and the like.

For a full understanding of the invention and the merits thereof and also to acquire a knowledge of the details of construction and the means for effecting the result, reference is to be had to the following description and accompanying drawings.

Figure 6:
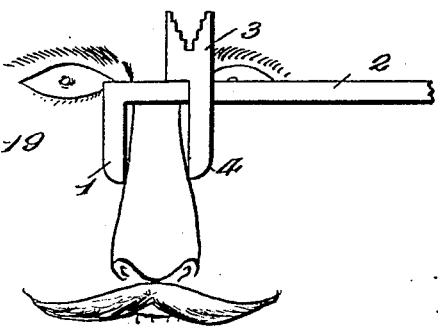
Figure 7:
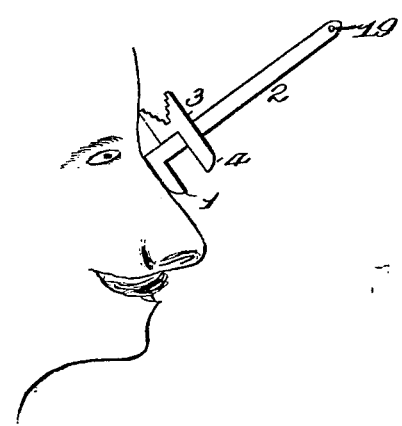
Figure 8:
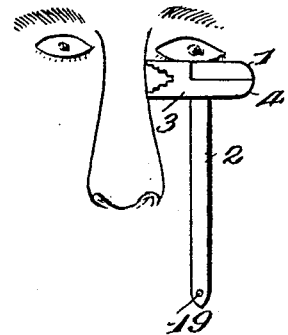

While the invention may be adapted to different forms and conditions by changes in the structure and minor details without departing from the spirit or essential features thereof, still the preferred embodiment is shown in the accompanying drawings, in which:

Figures 1 and 2 are obverse and reverse side views of an instrument embodying the invention. Fig. 3 is a view in elevation of the instrument adapted for measuring prisms. Fig. 4 is an edge view of the protractor or prism measure, showing it applied to an upper portion of an arm of the instrument, parts being broken away to show more clearly the relative construction and arrangement of the coöperating elements. Fig. 5 is a detail view showing the application of the instrument for measuring the pupillary distance. Fig. 6 is a detail view showing the application of the instrument for determining the width of the bridge. Fig. 7 is a detail view showing the application of the invention for determining the angle of the crest. Fig. 8 is a detail view illustrating the manner of ascertaining the angle of deviation in squint or strabismus.

Corresponding and like parts are referred to in the following description and indicated in all the views of the drawings by the same reference characters.

The instrument consists of angularly disposed arms 1 and 2, the latter being considerably longer than the former and consisting of a blade or bar. The short arm 1 forms a stop. A slide 3 is mounted upon the long arm or blade 2 and its opposite end portions are of different width. The narrow end 4 constitutes a stop to coöperate with the stop 1 to determine distances by bringing the inner edges of the stops 1 and 4 in register with opposite points, the distance between which is to be ascertained. The wide end 5 is formed in its outer extremity with a recess or opening having its opposite edges stepped or notched to form in effect a series of measures, whereby a gage is obtained to determine different widths of straps used in the fittings of spectacles and glasses. The long arm 2 is divided between its longitudinal edges by means of a separating line and scale graduations are impressed or otherwise made to appear upon opposite sides of the dividing line. One scale, as 6, indicates millimeters, whereas the other scale 7 is in inches and fractional parts thereof. Upon the opposite side of the long arm 2 other graduations appear. The graduations 8 at one end determine the angular measurement of the nose, as shown in Fig. 7. The graduations 9 determine the size or length of the lenses. The graduations 10 consist of a table representative of the amplitude of accommodation and near point for age, the same for convenience being arranged in three straight lines run lengthwise of the arm. The short arm or stop 1 is provided along its outer edge with graduations 11 which coöperate with similar graduations 12 along the outer edge of the wide end portion 5 of the slide 3. The scale graduations 11 and 12 determine the angle of deviation in squint or strabismus, as indicated in Fig. 8. One portion of the slide 3 is divided by means of a line 13, and scale graduations are provided upon opposite sides of said line, the one 14 being in millimeters and the other 15 in inches. The separating line 13 of the slide 3 coöperates with the dividing line 16 of the long arm 2 and enables the centering of the lens.

To determine the distance between the centers of the pupils of the eyes, the instrument is used as indicated in Fig. 5, the long arm 2 being arranged parallel with a straight line intersecting the pupils and the stops 1 and 4 being adjusted so that their inner edges touch parallel lines which, if projected, would pass through the pupils of the eyes. The distance between the stops 1 and 4, as indicated on either of the scales 6 and 7, determines and corresponds with the pupillary distance. To determine the width of the bridge, the instrument is applied as indicated in Fig. 6. For ascertaining the angle of crest of the nose, the stop 1 is placed upon the bridge of the nose with the end of the arm 2 in line with the forehead, after which the slide 3 is moved until the corner of the part 5 touches the forehead, when the distance from the outer edge of the part 5 to the outer edge of the stop 1 on the scale 8 indicates the angular measurement.
For indicating the angle of prisms, a protractor or pivoted scale is employed, the same consisting of a stem 17 and a curved bar 18, the latter being graduated from a central point towards opposite ends. The stem 17 is adapted to be pivotally connected to the long arm 2 in any manner to admit of the scale swinging freely to readily conform to any angular differences between the arm 2 and stem 17. As indicated, the long arm 2 is provided with an opening 19 and the stem 17 has a headed projection 20 to pass through the opening thereto and pivotally connect the protractor or prism measure with the arm 2. A keeper 21 is spaced from the curved bar 18 and is connected thereto at its ends and engages with the side of the arm 2 opposite to that adjacent to the curved bar 18. As shown in Fig. 3, to determine the angular measurement of a prism, the latter is placed upon a horizontal surface and the short arm or stop 1 is placed upon the upper side of the prism, thereby causing the arm 2 to project upward at an angle from the perpendicular corresponding to the upper inclination of the prism. The protractor or prism measure being free, assumes a position with its stem 17 perpendicular, hence the angle between the arm 2 and the stem 17 determined by the graduations on the curved bar 18, corresponds to the angular measurement of the prism.

It is to be understood that the instrument, while specially adapted for use of opticians in determining facial measurements, and for the fitting of appliances, such as spectacles, eye glasses and artificial eyes, may be utilized for other purposes where accurate linear or angular measurements are to be determined.

Having thus described the invention, what is claimed as new is:

1. A measuring instrument comprising right angular disposed arms of different relative lengths, the short arm constituting a stop and having graduations along its outer edge, and the long arm being subdivided by a longitudinal dividing line and having scale graduations along opposite edges, and a slide mounted upon the aforesaid long arm and having its opposite end portions of different width, the narrow end constituting a stop to coöperate with the aforementioned short arm, and the outer edge of the wide end being in line with the outer edge of said short arm when the slide is moved against the inner edge thereof, the outer edge of said wide end being graduated in a similar manner to the graduations of the aforementioned short arm, and said slide having graduations upon opposite sides of a dividing line.

2. An optician's measure, consisting of right angularly disposed arms of different lengths, and provided with scale graduations, a slide mounted upon the long arm and having its end portions of different width, the narrow end constituting a stop to coöperate with the short arm of the instrument and the wide end having an opening in its extremity with its opposite edges correspondingly stepped or off-set to form a separating gage.

3. A measure of the character set forth, comprising right angularly disposed arms of different length, a short arm constituting a stop and the long arm having graduations extending for a short distance along its outer edge from the outer edge of the said stop to determine the angle or crest measurement of the nose, and a slide movable upon said long arm and having its opposite ends of different widths, the outer edge of the wide end coming flush with the outer edge of the short arm of the instrument when the narrow end of the slide is moved against the inner edge of said short arm or stop.

4. In combination, angularly disposed arms of different lengths, a prism measure comprising a stem and a curved bar at one end of the stem and extending a like distance from opposite sides thereof and having similar graduations extending from the center towards opposite ends, said measure having its stem pivotally connected to the long arm of the instrument, and a keeper spaced from the curved bar and connected at its ends therewith, the long arm of the instrument being confined between said keeper and curved bar.

In testimony whereof I affix my signature in presence of two witnesses.

JOSEPH M. COGHLAN. [L. S.]

Witnesses:
T. C. BOYD,
JAMES A. CANFIELD.